United States Patent
Kates et al.

(10) Patent No.: US 6,172,883 B1
(45) Date of Patent: Jan. 9, 2001

(54) REDIRECTED SEQUENTIAL FLYBACK REGULATOR

(75) Inventors: Barry K. Kates, Austin; John Cummings, Round Rock, both of TX (US)

(73) Assignee: Dell USA, L.P., Round Rock, TX (US)

( * ) Notice: Under 35 U.S.C. 154(b), the term of this patent shall be extended for 0 days.

(21) Appl. No.: 09/236,132

(22) Filed: Jan. 22, 1999

(51) Int. Cl.[7] ............... H02M 3/335; H02M 7/44
(52) U.S. Cl. ..................... 363/21; 363/95; 363/97
(58) Field of Search ................... 363/21, 97, 98, 363/95; 364/708, 707; 361/686

(56) References Cited

U.S. PATENT DOCUMENTS

| | | | |
|---|---|---|---|
| 4,853,837 | 8/1989 | Gulczynski | 363/80 |
| 5,339,446 | * 8/1994 | Yamasaki | 395/795 |
| 5,390,101 | 2/1995 | Brown | 363/20 |
| 5,552,695 | 9/1996 | Schwartz | 323/271 |
| 5,673,173 | 9/1997 | Tsai | 361/686 |
| 5,734,254 | 3/1998 | Stephens | 320/106 |
| 5,745,358 | * 4/1998 | Faulk | 363/95 |

* cited by examiner

*Primary Examiner*—Peter S. Wong
*Assistant Examiner*—Rajnikant B. Patel
(74) *Attorney, Agent, or Firm*—Skjerven Morrill MacPherson LLP; Stephen A. Terrile; Mary Jo Bertani

(57) ABSTRACT

A switching flyback regulator circuit for providing a plurality of regulated DC voltage power supplies. The flyback regulator circuit includes a primary inductive element coupled in series with a first switch to turn charging current flow through the primary inductive element ON and OFF. A first secondary inductive element having a first end coupled to supply a first power source. A second secondary inductive element has a first end coupled to produce the second power source, and a second end coupled to a second switch to turn current flow through the second secondary inductive element ON and OFF. The first secondary inductive element and the second secondary inductive element are magnetically coupled to the primary inductive element. A control circuit generates a ramped voltage signal having a negative slope to control the ON and OFF duty cycle of the second switch such that when the first switch is operated to allow the primary inductive element to discharge, current flows through the first secondary inductive element before current flows in the other secondary inductive element. The current through the second switch is zero when the second switch is turned OFF and ON, thereby eliminating switching losses and improving efficiency of the flyback regulator circuit.

20 Claims, 5 Drawing Sheets

REDIRECTED SEQUENTIAL FLYBACK REGULATOR

BACKGROUND OF THE INVENTION

1. Field of the Invention

This invention relates to the field of switching power supplies, and more particularly, to a flyback regulator for providing a low voltage power supply and a high voltage power supply.

2. Description of the Related Art

Audio, graphics, and data processing requirements in portable devices such as laptop computers are constantly increasing. The increased processing capability is accompanied by increasing power dissipation and heat. There is a corresponding requirement for portable power supplies that are as energy and space efficient as possible. Temperature management is also a high priority, as elevated temperatures may adversely affect a device's reliability. To meet power requirements, the trend in the industry is to use a greater number of power supplies that provide lower voltages and increased current.

Portable electronic devices are typically capable of operating with regulated DC power supply from a portable, rechargeable battery pack, or from an AC power supply using an AC to DC adapter having one end that plugs into an electrical socket and another end that plugs into the device. The adapter supplies power to operate the device as well as to recharge the battery pack. AC adapter power conversion and battery recharging is accomplished most efficiently at high output voltage. To improve battery charging efficiency, it is therefore desirable to provide a high voltage signal to charge batteries.

Many portable electronic devices utilize Lithium icon (Li-ion) batteries which are capable of providing both high voltage and excellent capacity, resulting in relatively high energy density. The internal impedance of Li-ion batteries is very high, however, and the batteries are therefore more efficiently utilized in circuits; that require high voltage and low current. This characteristic runs contrary to the industry trend to use lower voltages and increased current.

Converting DC voltage supplied by the battery or AC adapter to regulated DC voltage supplied to the device is accomplished most efficiently in situations where there is a low input to output voltage differential. This characteristic also runs contrary to the industry trend to utilize lower operating voltage, however, since low operating voltages increase the differential between the input and the output voltage. The differential voltage depends on the voltage delivered by the battery or the AC adapter and is typically greatest when utilizing power supplied by the AC adapter. To improve conversion efficiency, it is therefore desirable to generate a low voltage input signal that may be converted to regulated DC voltage supplied to the device.

Re-chargers for portable batteries utilize switching regulators to regulate DC power input to the battery pack. Switching regulators are typically classified into different configurations or "topologies." One such topology is the inverting or "flyback" regulator where a switch determines whether the voltage applied to an inductor is the input voltage, $V_{dc}$, or zero. In this manner, the output voltage is a function of the average voltage applied to the inductor. The regulator controls; the turning ON and turning OFF of the switch in order to regulate the flow of power to the load. The switching regulator employs inductive energy storage elements to convert the switched current pulses into a steady load current. Power in a switching regulator is thus transmitted across the switch in discrete current pulses.

In order to generate a stream of current pulses, switching regulators typically include control circuitry to turn the switch on and off. The switch duty cycle, which controls the flow of power to the load, can be varied by a variety of methods. For example, the duty cycle can be varied by either (1) fixing the pulse stream frequency and varying the ON or OFF time of each pulse, or (2) fixing the ON or OFF time of each pulse and varying the pulse stream frequency. Which ever method is used to control the duty cycle, the switch in switching regulators is, either OFF, where no power is dissipated by the switch, or ON in a low impedance state, where a small amount of power is dissipated by the switch. This generally results in fairly efficient operation with regard to the average amount of power dissipated.

In view of the foregoing, it is desirable to provide an AC adapter utilizing a switching regulator that is capable of supplying a plurality of different voltages to efficiently meet the device's low voltage and high voltage requirements.

SUMMARY

In one embodiment, a switching regulator circuit for providing a plurality of regulated DC voltage power supplies is provided. The regulator circuit includes a primary inductive element coupled in series with a first switch to turn charging current flow through the primary inductive element ON and OFF, and a first secondary inductive element having a first end coupled to produce a first power source. The first secondary inductive element is magnetically coupled with the primary inductive element. A second secondary inductive element is also magnetically coupled with the primary inductive element and includes a second switch coupled to turn current flow through the second secondary inductive element ON and OFF. A control circuit is coupled to control the ON and OFF duty cycle of the second switch such that when the first switch is operated to induce magnetizing current in the secondary inductive elements by discharging the primary inductive element during the flyback interval. Current is forced to flow through the first secondary inductive element before the second secondary inductive element by keeping the second switch open until the energy requirements of the load connected to the first secondary inductive element are met. The second switch does not close until the flyback current is zero. Energy losses relative to the second switch are thus minimized since the second switch is operated when the magnitude of the current is either reduced from its beginning value or zero.

The present invention includes a ramped voltage generator circuit that outputs a ramp voltage signal for input to the control circuit. The magnitude of the ramp voltage signal decreases during each duty cycle of the first switch. The second switch is turned on when the value of the ramp voltage signal is less than or equal to a reference voltage. The second switch is turned off after the flyback interval is complete and before the start of the next flyback interval. The ramped voltage generator circuit includes a third switch coupled in parallel to the third inductive element, a capacitor coupled in parallel to the third switch, and a current sink coupled in parallel to the capacitor. The capacitor is pulled up to a charged level between flyback intervals and discharges during the flyback intervals to create the ramp voltage signal.

The control circuit includes an error amplifier for generating an error signal indicative of the voltage output by the second power source, a pulse width modulator coupled to receive the feedback signal and the ramp voltage signal. The pulse width modulator generates a driver signal that is input to a latch circuit that outputs the driver signal to the second switch.

Another embodiment of the present invention provides a method for generating a plurality of regulated DC voltage supplies utilizing a flyback regulator. The flyback regulator includes a primary inductive element magnetically coupled to a plurality of secondary inductive elements wherein one of the secondary inductive elements is coupled to a first switch. The method includes:

- opening the first switch coupled with the one secondary inductive element;
- charging the primary inductive element with a charge current over a controlled time period;
- opening a second switch coupled to the primary inductive element, thereby reversing polarity of the inductive elements and causing magnetizing current to flow through another one of the secondary inductive elements;
- generating a ramped voltage signal having a negative slope, and closing the first switch based on the ramped voltage signal and an error signal; and
- determining when to close the first switch subsequent to opening the second switch to allow current to flow through the one secondary inductive element.

Determining when to close the first switch includes generating an error signal indicative of the voltage output by the second power source; and generating a driver signal based on the feedback signal and the ramped voltage signal. The driver signal is set to close the first switch when the ramped voltage is less than or equal to the feedback signal and to open the first switch when the primary inductor begins charging. The second switch is coupled to the primary inductive element and is opened based on a signal from a control circuit between the primary inductive element and one of the secondary inductive elements.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
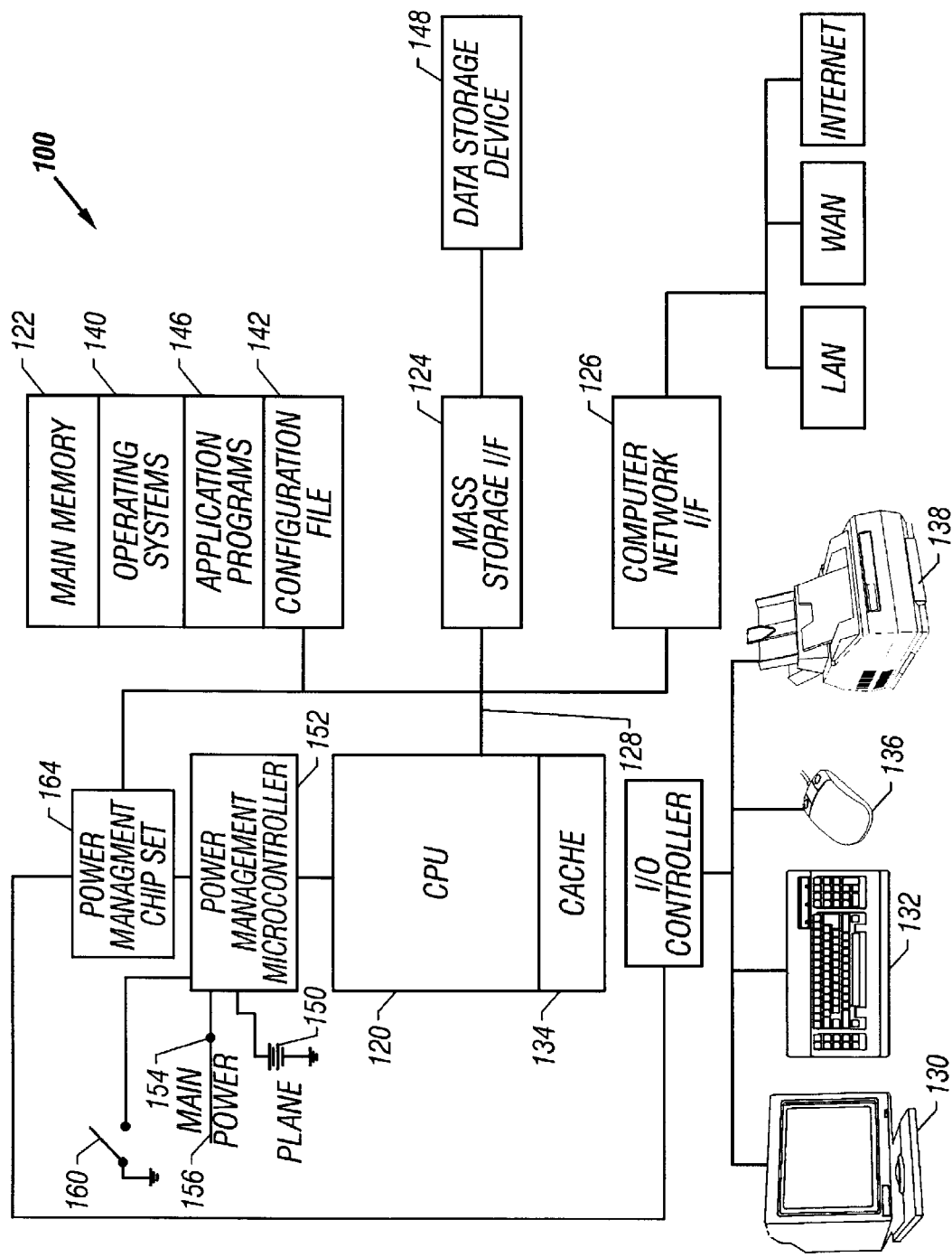
FIG. 1 is a block diagram of a components included in a laptop computer system.

Referring now to FIG. 1, a diagram of components commonly included in a computer system 100 within which the present invention may be utilized is shown. Those skilled in the art will appreciate, however, that the present invention may be utilized in other systems that requires an input voltage to be adapted to supply power to two or more electrically-operated components within the system, with computers being one example.

Computer system 100 includes a central processing unit (CPU) 120, main memory 122, mass storage interface 124, and network interface 126, all connected by system bus 128. Note that system bus 128 may be a collection of several individual special purpose data busses known in the art such as a CPU bus, local bus, EISA bus, and/or SCSI bus. Computer system 100 encompasses all types of computer systems: personal computers, midrange computers, mainframes, etc. Note that many additions, modifications, and deletions can be made to this computer system 100 when used with the present invention. Examples of this are computer display 130, input keyboard 132, cache memory 134, and peripheral devices such as mouse 136 and printer 138. Computer system 100 may be one of many workstations connected to a local area network (LAN), a wide area network (WAN), or a global information network such as the Internet.

CPU 120 can be constructed from one or more microprocessors and/or integrated circuits. Main memory 122 stores programs and data that the CPU 120 may access. When computer system 100 starts up, CPU 120 initially executes the operating system 140 program instructions. Operating system 140 is a program that manages the resources of the computer system 100, such as the CPU 120, main memory 122, mass storage interface 124, network interface 126, and system bus 128. The operating system 140 reads one or more configuration files 142 to determine the hardware and software resources connected to the computer system 100.

Main memory 122 includes the operating system 140, configuration file 142, and one or more application programs 146 with related program data. Application programs 146 can run with program data as input, and output their results as program data in main memory 122 or to one or more mass storage devices 148 through mass storage interface 124. The CPU 120 executes many application programs such as an application program 146 to establish a connection to a computer network through network interface 126.

Mass storage interface 124 allows computer system 100 to retrieve and store data from auxiliary storage devices such as magnetic disks (hard disks, diskettes) and optical disks (CD-ROM). The mass storage devices are commonly known as Direct Access Storage Devices (DASD), and act as a permanent store of information. The information from the DASD can be in many forms including application programs and program data. Data retrieved through mass storage interface 124 is usually placed in main memory 122 where CPU 120 can process it.

While main memory 122 and data storage devices 148 are typically separate storage devices, computer system 100 may use known virtual addressing mechanisms that allow the programs of computer system 100 to behave as if they only have access to a large, single storage entity, instead of access to multiple, smaller storage entities (e.g., main memory 122 and mass storage devices 148). Therefore, while certain elements are shown to reside in main memory 122, those skilled in the art will recognize that these are not necessarily all completely contained in main memory 122 at the same time. It should be noted that the term "memory" is used herein to generically refer to the entire virtual memory of computer system 100.

Network interface 126 allows computer system 100 to send and receive data to and from any network computer system 100 may be connected to. This network may be a local area network (LAN), a wide area network (WAN), or a global information network such as the Internet. Suitable methods of connecting to the Internet 110 include known analog and/or digital techniques, as well as networking mechanisms that are developed in the future. Many different network protocols can be used to) implement a network. The protocols are implemented in specialized software programs that allow computers to communicate across a network. TCP/IP (Transmission Control Protocol/Internet Protocol), used to communicate across the Internet 110, is an example of a suitable network protocol.

System bus 128 allows data to be transferred among the various components of computer system 100. Although computer system 100 is shown to contain only a single main CPU 120 and a single system bus 128, those skilled in the art will appreciate that the present invention may be practiced using a computer system that has multiple CPUs 120 and/or multiple busses 128. In addition, the interfaces that are used in the preferred embodiment may include separate, fully programmed microprocessors that are used to off-load computationally intensive processing from CPU 120, or may include input/output (I/O) adapters to perform similar functions.

Computer system 100 includes a power supply 150, for example, a battery, which provides power to the many components included in computer system 100. Power supply 150 is typically a rechargeable battery, such as a nickel metal hydride ("NiMH") or lithium ion battery, when computer system 100 is embodied as a portable or notebook computer. Power supply 150 is coupled to a power management microcontroller 152 which controls the distribution of power from power supply 150. More specifically, microcontroller 152 includes a power output 154 coupled to the main power plane 156 which supplies power to CPU 120. Power microcontroller 152 is also coupled to a power plane (not shown) which supplies power to computer display 130. Microcontroller 152 monitors the charge level of power supply 150 to determine when to charge and when not to charge battery. Microcontroller 152 is coupled to a main power switch 160 which the user actuates to turn the computer system 100 on and off. While microcontroller 152 powers down other portions of computer system 100 such as mass storage devices 148 when not in use to conserve power, microcontroller 152 itself is always coupled to a source of energy, namely power supply 150.

Computer system 100 also includes a power management chip set 164 coupled to CPU 120 via bus 128 so that power management chip set 164 can receive power control commands from CPU 120. Power management chip set 164 is connected to a plurality of individual power planes (not shown) which supply power to respective devices in computer system 100 such as mass storage devices 148, for example. In this manner, power management chip set 164 acts under the direction of CPU 120 to control the power to the various power planes and devices of the computer.

Different electrically-operated components in computer system 100 may each require a different level of DC voltage for operation. Computer system 100 typically includes regulator circuitry for converting AC voltage from an AC power source or DC voltage from an unregulated DC power source to precisely regulated levels of DC voltage. The different voltages are then provided to appropriate components in computer system 100. There are several known topologies of regulator circuitry utilizing switching regulators for converting the voltage from one level to another. Many of the topologies require an output filter inductor that entails significant cost and physical space requirements. The present invention utilizes a topology known as a flyback regulator which does not require an output filter inductor and is therefore suited for applications where space is limited, such as laptop computer systems.

Figure 2:
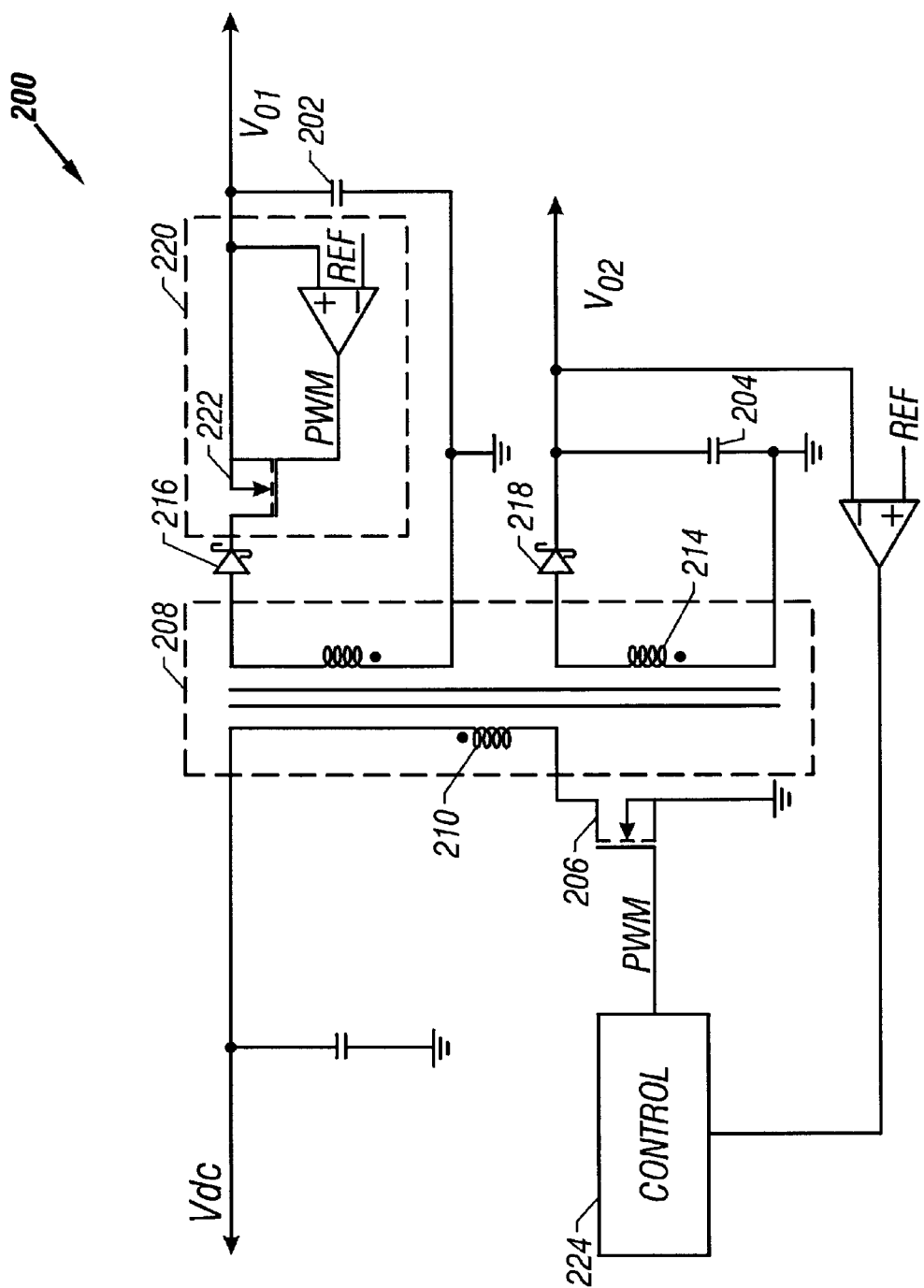
FIG. 2 is a schematic block diagram of a known flyback switching regulator.

FIG. 2 shows a diagram of a known flyback regulator circuit 200 for providing a plurality of regulated DC voltage power supplies. As the present invention is designed to overcome disadvantages associated with such a circuit, basic principles of regulator circuit 200 operation will be briefly summarized.

Regulator circuit 200 operates from an unregulated DC supply voltage $V_{dc}$ coupled to a terminal, e.g., a battery (not shown). Note that the DC source may be derived from the output of an AC adapter, or by other conventional means. The alternating sequence of open and close actions by switching MOSFET 206 regulates the voltage such that the longer switching MOSFET 206 is closed, the higher the voltage stored in primary inductive element 210. The voltage is applied sequentially to capacitors 202 and 204 as described hereinbelow. Capacitors 202, 204 smooth the pulsing supply of current to provide regulated voltage $V_{o1}$ and $V_{o2}$, respectively.

Regulator circuit 200 includes transformer 208 having primary inductive element 210 coupled in series with switching MOSFET 206 to turn charging current flow through the primary inductive element 210 ON and OFF. When MOSFET 206 is ON, the ends of primary inductive element 210 and secondary inductive elements 212, 214 shown with a dot are positive with respect to the ends without dots. Output rectifier diodes 216 and 218 are reverse-biased and all the output load currents are supplied from storage filter capacitors 202 and 204. During the time MOSFET 206 is ON, a fixed voltage exists across primary inductive element 210 and current in it ramps up linearly. The amount of energy stored in primary inductive element 210 is proportional to the amount of time MOSFET 206 is ON and is limited by the inductive capacity of primary inductive element 210.

When MOSFET 206 turns OFF, magnetizing inductance force causes reversal of polarity on inductive elements 210, 212, 214. Since the current in an inductor cannot change instantaneously, at the instant of turnoff, the current in primary inductive element 210 transfers to the secondary portion of transformer 208. This current transfer is known as the flyback interval. Assuming secondary inductive element 212 has a greater inductive capacity than secondary inductive element 214 (i.e., inductive capacity is proportional to the number of turns), the current flows naturally to secondary inductive element 212. Feedback circuit 220 turns MOSFET 222 ON at the start of the flyback interval and turns MOSFET 222 OFF when the required output voltage $V_{o1}$ has been supplied. The remaining flyback current is then diverted to secondary inductive element 214 to supply output voltage $V_{o2}$.

With MOSFET 206 OFF, the dot end of the secondary inductive elements 212, 214 is negative with respect to the no-dot ends and current flows out of primary inductive element 210, but ramps down linearly at a rate proportional to its inductive capacity. When the secondary current has ramped down to zero before the start of the next MOSFET 206 ON time, all the energy stored in the primary inductive element 210 when MOSFET 206 was ON has been delivered to the loads and the circuit is operating in a discontinuous mode. Control circuit 224 maintains constant output voltage by keeping the product $V_{dc}T_{on}$ constant.

One problem with the flyback regulator shown in FIG. 2 are energy losses that occur when MOSFET 222 switches ON and OFF at high current levels. The present invention changes the sequence in which current is transferred to secondary inductive elements so that current through such a switch is lower at turn ON and zero at turn OFF, thereby substantially reducing the switching losses.

Figure 3:
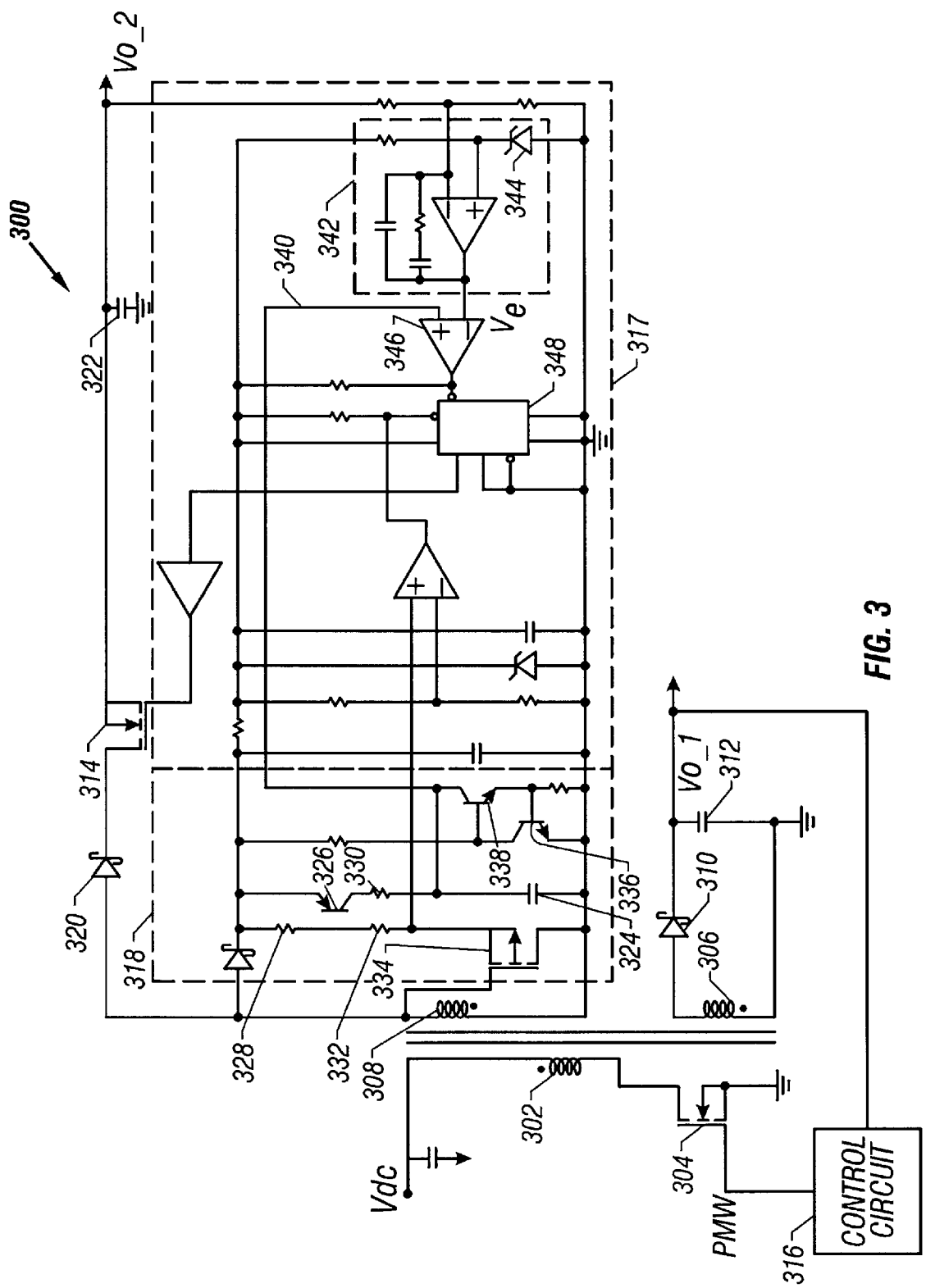
FIG. 3 is a schematic block diagram of a switching regulator circuit according to the present invention.

FIG. 3 shows a diagram of an embodiment of the present invention for at regulator circuit 300 that provides two regulated DC voltages, $V_{o1}$ and $V_{o2}$. Regulator circuit 300 includes primary inductive element 302 coupled in series with a first switch, shown as MOSFET 304, to turn charging current flow through primary inductive element 302 ON and OFF. Secondary inductive elements 306, 308 are magnetically coupled with primary inductive element 302, such as those found in commercially available gapped ferrite core transformers. When energy is transferred by primary inductive element 302, output voltage $V_{o1}$ is generated by the combination of secondary inductive element 306, diode 310, and capacitor 312 coupled together as shown in FIG. 3. This combination forms one source of power that may be provided to operate one or more components in computer system 100. Secondary inductive element 308 forms part of a second power source that produces second output voltage $V_{o2}$. Another switch, shown as MOSFET 314, is connected in series with inductive element 308 to turn current flow through inductive element 308 ON and OFF.

Figure 4A:
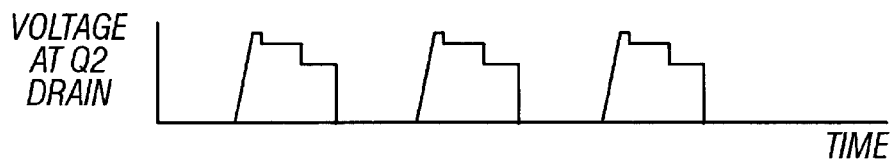
FIGS. 4A–4G are time history diagrams of voltage and current signals at various locations of the switching regulator circuit.
Figure 4B:
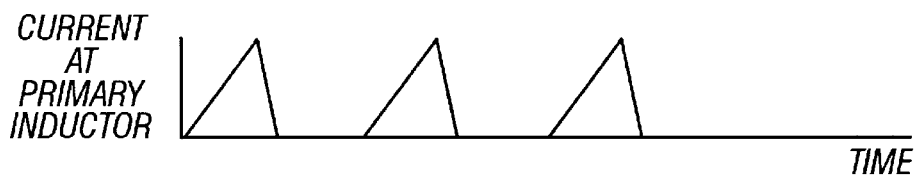
Figure 4C:
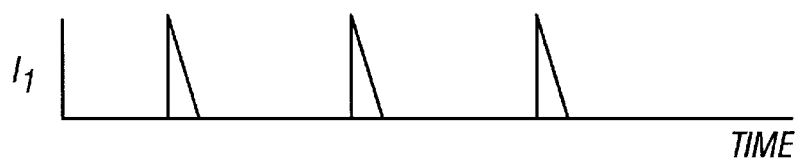
Figure 4D:
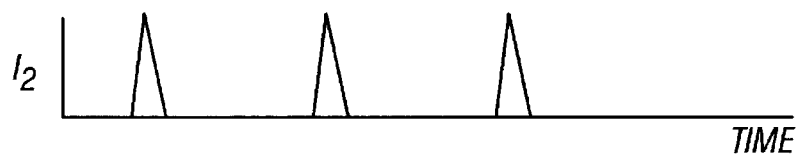
Figure 4E:
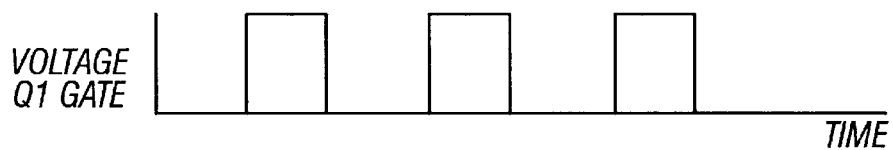
Figure 4F:
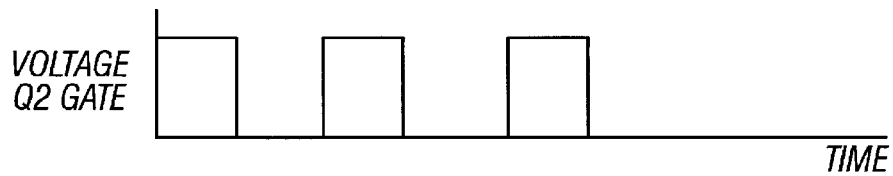

Control circuits 316, 317 control the switching of MOSFETs 304, 314 such that when MOSFET 304 is operated to allow primary inductive element 3012 to discharge, current flows through secondary inductive element 306 before flowing in secondary inductive element 308. When MOSFET 304 is ON, the ends of primary inductive element 302 and secondary inductive elements 306, 308 shown with a dot are positive with respect to the ends without dots. Output rectifier diodes 310, 320 are reverse-biased and all the output load currents are supplied from storage filter capacitors 312 and 322. During the time MOSFET 304 is ON, a fixed voltage exists across primary inductive element 302 and current in it ramps up linearly. Time history diagrams of flyback voltage and currents in the primary inductive element 302 and secondary inductive elements 306, 308 are shown in FIGS. 4a through 4d, respectively. FIGS. 4e and 4f show switching times of MOSFETs 304 and 314, respectively.

When MOSFET 304 turns OFF, magnetizing inductance force causes reversal of polarity on inductive elements 302, 306, 308. Current in primary inductive element 302 transfers to secondary inductive elements 306, 308 during the flyback interval. Assuming secondary inductive element 308 has a greater inductive capacity than secondary inductive element 306 (i.e., inductive capacity is proportional to the number of turns), the current naturally tries to flow to secondary inductive element 308. In the present invention, however, control circuit 317 turns MOSFET 314 OFF at the start of the flyback interval and turns MOSFET 314 ON after the required output voltage $V_{o1}$ has been supplied. This causes the remaining flyback current to divert to secondary inductive element 308 to supply output voltage $V_{o2}$. In this manner, switching energy losses are eliminated when MOSFET 314 turns OFF since current is zero. Energy losses are also substantially reduced compared to prior art devices (as shown in FIG. 2) when MOSFET 314 turns ON, since the magnitude of the flyback current is substantially lower than it would be when switching occurs during an earlier portion of the flyback interval.

Figure 4G:
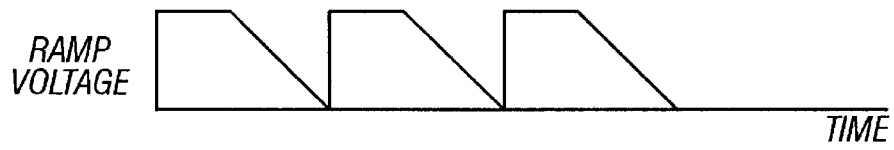

The embodiment of the present invention shown in FIG. 3 utilizes ramped voltage generator circuit 318 coupled to secondary inductive element 308 on one end and to control circuit 317 on the other end to turn MOSFET 314 ON and OFF at the appropriate times. Ramped voltage generator circuit 318 includes capacitor 324 that is pulled up to a charged value at the end of each flyback interval when MOSFET 314 turns OFF by operation of transistor 326, resistors 328, 330, 332, and MOSFET 334. Specifically, during the flyback interval, p-channel MOSFET 334 and transistor 326 turn OFF. When the flyback interval is completed, the polarity of secondary inductive element 308 reverses, MOSFET 334 and transistor 326 are turned ON, and capacitor 324 recharges. During the flyback interval, transistors 336 and 338 form a constant current sink that discharges the voltage in capacitor 324 over time at constant current as shown in FIG. 4g, forming a ramp voltage signal 340 with a negative slope on the ramp portion of the signal. Capacitor 324 recharges and discharges over each duty cycle (i.e., each ON/OFF cycle) of MOSFET 304.

Control circuit 317 includes error amplifier 342 that generates an error signal $V_e$ based on the difference between output voltage Vo2 and a reference voltage, which may be provided by one of several known techniques such as utilizing zener diode 344. Pulse width modulator 346 receives error signal Ve and ramp voltage signal 340, and generates a driver signal that is input to latch circuit 348. When the ramp crosses the value of error signal $V_e$, latch circuit 348 outputs a positive pulse and turns MOSFET 314 ON. Thus, using negative ramp voltage signal 340 as a trigger delays switching MOSFET 314 ON until energy required for output voltage $V_{o1}$ is met. At the time MOSFET 314 is switched ON, the flyback current has a lower value, and thus switching losses are not as high. The residual flyback current is used to provide second output voltage $V_{o2}$, and MOSFET 314 does not switch OFF until flyback current is zero, resulting in no energy loss at switch OFF.

The duty cycle of flyback regulator 300 is controlled by control circuit 316 which is coupled between primary inductive element 302 and secondary inductive element 306. Control circuit 316 receives output voltage signal $V_{O1}$ as a feedback signal and generates a pulse width modulated (PWM) signal that alternately turns MOSFET 304 ON and OFF as required to provide an alternating supply of current through primary inductive element 302 that meets the energy requirements of the loads connected to receive output voltages $V_{o1}$ and $V_{o2}$.

Figure 5:
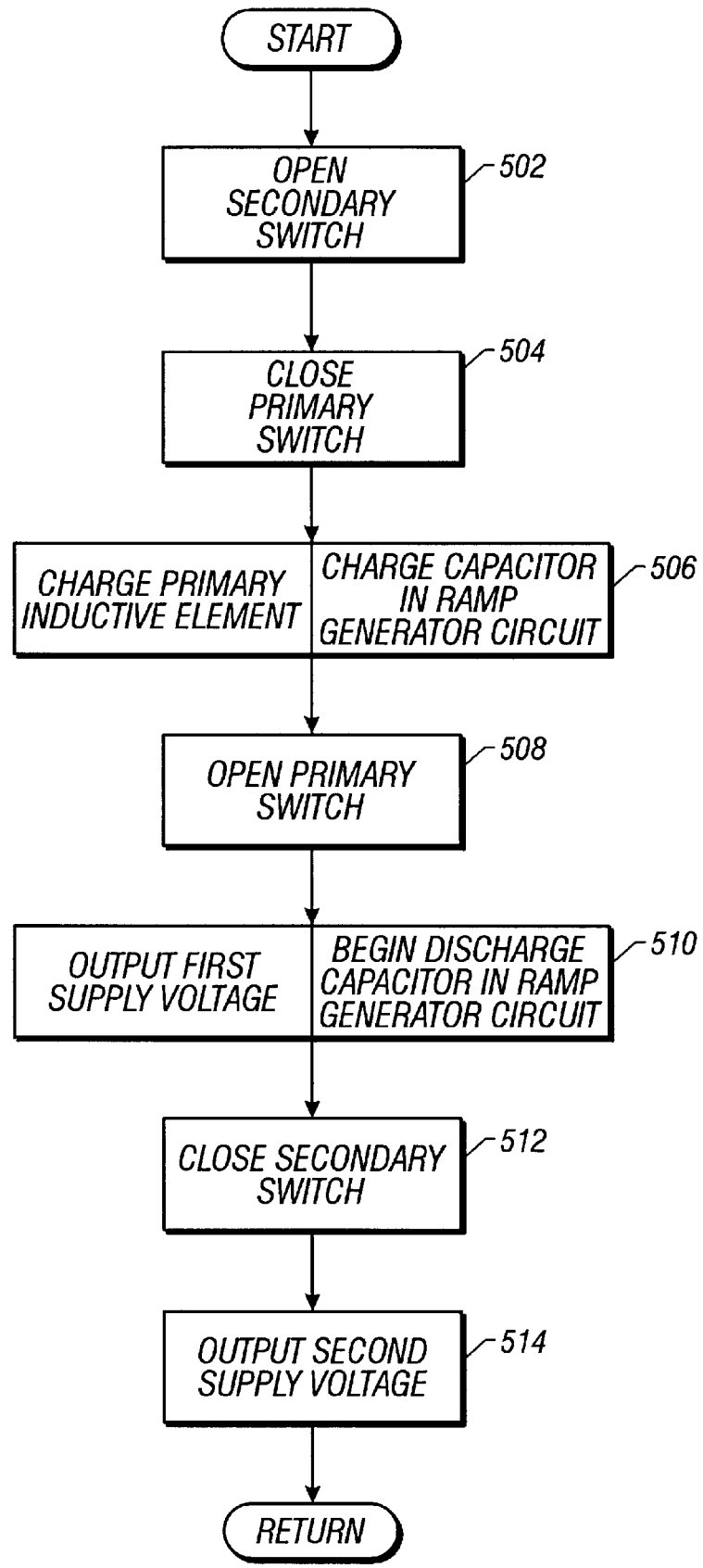
FIG. 5 is a flowchart of a method for supplying a plurality of DC voltages with a flyback regulator according to the present invention.

The sequence for generating a plurality of regulated DC voltage supplies utilizing a flyback regulator 300 such as shown in FIG. 3, that includes primary inductive element 302 magnetically coupled to at le(ast two secondary inductive elements 306, 308, with one of the secondary inductive elements 308 being coupled to an electronic switch (MOSFET 314), is presented in flowchart form in FIG. 5. The sequence begins by opening the switch (MOSFET 314) coupled in series with the one secondary inductive element 308 as shown in block 502. Next, another electronic switch (MOSFET 304) coupled to the primary inductive element 302 is closed as shown in block 504. This causes the primary inductive element 302 and capacitor 324 to be charged over a controlled time period as shown in block 506 determined by control circuit 316. Block 508 shows that the switch coupled to the primary inductive element 302 is then opened. This causes reversal of polarity of the inductive elements, and since MOSFET 314 is open, magnetizing current flows through secondary inductive element 306 thereby providing output voltage $V_{o1}$ (block 510). At the same time current is flowing through secondary inductive element 306, capacitor 324 is discharging, generating a ramped voltage signal with a negative slope. When the value of the ramped voltage signal intersects an error voltage., MOSFET 314 is latched closed as shown in block 512, thereby providing output voltage signal $V_{o2}$ (block 514). The cycle shown in FIG. 5 repeats at a frequency controlled by control circuit 316 that results in a relatively constant, or regulated, DC voltages being supplied to loads attached to the power supplies.

The embodiment of the present invention shown in FIG. 3 utilizes electronic hardware components, however, the present invention may be implemented using alternative combinations of components. For example, control circuit 317 could be any device capable of receiving signals from ramped voltage generator circuit 318 and any other type of reference voltage source instead of zener diode 344 and generating an error signal for input to another component that generates a control signal that is used to control the switching of MOSFET 314. One such device could be a microcontroller utilizing hardware, software, and/or firmware to receive the signals and provide a control signal which is utilized to regulate the duty cycle of MOSFET 314 so that current flows through secondary inductive element 306 before secondary inductive element 308 during the flyback interval. Thus, it should be understood that the present invention provides a system for generating multiple output voltages from one input voltage that minimizes energy losses across switching elements by resequencing the order in which the power supply circuits receive flyback current so that the switching elements switch at lower, or zero, current values.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed:

1. A computer system comprising:
    a memory having a set of program instructions stored therein;
    a plurality of electrically-operated components including a first component coupled to receive power from a first power source and a second component coupled to receive power from a second power source;
    a regulator circuit operable to provide the first power source and the second
    power source, the regulator circuit including:
        a first inductive element coupled in series with a first switch to turn current flow through the first inductive element ON and OFF;
        a second inductive element having a first end coupled to produce the first power source, and magnetically coupled with the first inductive element;
        a third inductive element magnetically coupled with the first inductive element, the third inductive element having greater inductive capacity than the second inductive element, a first end coupled to produce the second power source, and a second switch to turn current flow through the third inductive element ON and OFF; and
        a control circuit coupled to control the ON and OFF duty cycle, of the second switch such that when the current is allowed to discharge through the first inductive element, current flows through the third inductive element subsequent to current flow in the second inductive element.

2. The computer system, as set forth in claim 1, further comprising a ramped voltage generator circuit that outputs a ramp voltage signal, the control circuit being coupled to receive the ramp voltage signal.

3. The computer system, as set forth in claim 2, wherein the magnitude of the ramp voltage signal decreases during each duty cycle of the first switch.

4. The computer system, as set forth in claim 3, wherein the control circuit includes:
    an error amplifier for generating an error signal indicative of the voltage output by the second power source;
    a pulse width modulator coupled to receive the feedback signal and the ramp voltage signal, the pulse width modulator generating a driver signal; and
    a latch circuit coupled to receive the driver signal and to output the driver signal to the second switch.

5. The computer system, as set forth in claim 1, wherein the first, second, and third inductive elements comprise a flyback regulator, the flyback regulator further comprising a feedback circuit coupled between the first inductive element and the second inductive element.

6. The computer system, as set forth in claim 2, wherein the ramped voltage generator circuit includes a third switch coupled in parallel to the third inductive element, a capacitor coupled in parallel to the third switch, and a current sink coupled in parallel to the capacitor.

7. A regulator circuit for providing a plurality of regulated DC voltage power supplies, the regulator circuit comprising:
    a first inductive element coupled in series with a first switch to turn charging current flow through the first inductive element ON and OFF;
    a second inductive element having a first end coupled to produce the first power source, and magnetically coupled with the first inductive element;
    a third inductive element magnetically coupled with the first inductive element, the third inductive element having greater inductive capacity than the second inductive element, a first end coupled to produce the second power source, and a second switch to turn current flow through the third inductive element ON and OFF;
    a control circuit coupled to control the ON and OFF duty cycle of the second switch such that when the first switch is operated to allow the first inductive element to discharge, current flows through the second inductive element before current flows in the second inductive element.

8. The regulator circuit, as set forth in claim 7, further comprising a ramped voltage generator circuit that outputs a ramp voltage signal, the control circuit being coupled to receive the ramp voltage signal.

9. The regulator circuit, as set forth in claim 8, wherein the magnitude of the ramp voltage signal decreases during each duty cycle of the first switch.

10. The regulator circuit, as set forth in claim 9, wherein the control circuit includes:
    an error amplifier for generating an error signal indicative of the voltage output by the second power source;
    a pulse width modulator coupled to receive the feedback signal and the ramp voltage signal, the pulse width modulator generating a driver signal; and
    a latch circuit coupled to receive the driver signal and to output the driver signal to the second switch.

11. The regulator circuit, as set forth in claim 7, wherein the first, second, and third inductive elements comprise a flyback regulator, the flyback regulator further comprising a feedback circuit coupled between the first inductive element and the second inductive element.

12. The regulator circuit, as set forth in claim 8, wherein the ramped voltage generator circuit includes a third switch coupled in parallel to the third inductive element, a capacitor coupled in parallel to the third switch, and a current sink coupled in parallel to the capacitor.

13. A method for generating a plurality of regulated DC voltage supplies utilizing a flyback regulator, the flyback regulator including a primary inductive element magnetically coupled to a plurality of secondary inductive elements wherein one of the secondary inductive elements is coupled to a first switch, the one secondary inductive element having a greater inductive capacity than the other secondary inductive elements, the method comprising:

opening the first switch coupled with the one secondary inductive element;

charging the primary inductive element with a charge current over a controlled time period;

opening a second switch coupled to the primary inductive element, thereby reversing polarity of the inductive elements and causing magnetizing current to flow through another one of the secondary inductive elements; and determining when to close the first switch subsequent to opening the second switch to allow current to flow through the one secondary inductive element.

14. The method, as set forth in claim 13, further comprising generating a ramped voltage signal having a negative slope, and closing the first switch based on the ramped voltage signal and an error signal.

15. The method, as set forth in claim 14, wherein determining when to close the first switch comprises:

generating an error signal indicative of the voltage output by the second power source; and generating a driver signal based on the feedback signal and the ramped voltage signal, the driver signal being set to close the first switch when the ramped voltage is less than or equal to the feedback signal and to open the first switch when the primary inductor begins charging.

16. The method, as set forth in claim 13, further comprising determining when to open the second switch coupled to the primary inductive element based on a signal from a control circuit between the primary inductive element and one of the secondary inductive elements.

17. The method, as set forth in claim 14, wherein generating the ramped voltage signal includes coupling a third switch in parallel to the one secondary inductive element, coupling a capacitor in parallel to the third switch, and coupling a current sink in parallel to the capacitor.

18. A method for changing the output sequence of a regulator circuit utilizing a flyback regulator to generate a plurality of DC voltage supplies, the flyback regulator including a primary inductive element magnetically coupled to at least two secondary inductive elements, the method comprising:

opening a first switch coupled in series with one secondary inductive element;

charging the primary inductive element with a charge current over a controlled time period;

discharging the current stored in the primary inductive element by opening a second switch coupled to the primary inductive element;

generating a ramped voltage signal having a negative slope;

generating an error signal indicative of the voltage output by a DC voltage supply circuit coupled to the one secondary inductive element; and generating a driver signal based on the error signal and the ramped voltage signal, the driver signal being set to close the first switch when the ramped voltage is less than or equal to the error signal and to open the first switch when the primary inductor begins charging.

19. The method, as set forth in claim 18, wherein the current stored in the primary inductive element is discharged based on a signal from a control circuit coupled between the primary inductive element and one of the secondary inductive elements.

20. The method, as set forth in claim 18, wherein generating the ramped voltage signal includes coupling a third switch in parallel to the one secondary inductive element, coupling a capacitor in parallel to the third switch, and coupling a current sink in parallel to the capacitor.

* * * * *